United States Patent [19]

Corkhill

[11] 4,121,191

[45] Oct. 17, 1978

[54] SEISMIC DATA TAPE RECORDING SYSTEM

[75] Inventor: David P. Corkhill, St. Albans, England

[73] Assignee: Standard Oil Company (Indiana), Chicago, Ill.

[21] Appl. No.: 673,329

[22] Filed: Apr. 5, 1976

[51] Int. Cl.² ............................................. G01V 1/40
[52] U.S. Cl. ....................... 340/15.5 DP; 340/18 CM
[58] Field of Search ................ 340/15.5 DP, 15.5 TS, 340/172.5, 18 CM; 364/900 MS File

[56] References Cited

U.S. PATENT DOCUMENTS

| | | | |
|---|---|---|---|
| 2,436,503 | 2/1948 | Cleveland | 340/15.5 TC |
| 2,934,741 | 4/1960 | Gray et al. | 340/15.5 GC |
| 2,960,379 | 11/1960 | Lipscomb | 340/15.5 TC |
| 3,344,406 | 9/1967 | Vinal | 340/172.5 |
| 3,356,990 | 12/1967 | Sloughter | 340/15.5 TS |
| 3,437,991 | 4/1969 | Porter | 340/15.5 DP |
| 3,439,342 | 4/1969 | Barton | 340/172.5 |
| 3,488,661 | 1/1970 | Tanguy | 340/15.5 DP |
| 3,582,901 | 6/1971 | Cochrane et al. | 340/172.5 |
| 3,621,219 | 10/1971 | Washizuka et al. | 340/172.5 |
| 3,629,855 | 12/1971 | Conley | 340/172.5 |
| 3,646,509 | 2/1972 | Hughes et al. | 340/15.5 MC |
| 3,662,346 | 5/1972 | Tada | 340/172.5 |
| 3,678,468 | 7/1972 | Jefferson et al. | 340/172.5 |
| 3,805,254 | 4/1974 | Schuur | 340/172.5 |
| 3,806,864 | 4/1974 | Broding et al. | 340/15.5 TS |
| 3,875,386 | 4/1975 | Tsuiki et al. | 340/172.5 |
| 4,012,712 | 3/1977 | Nelligan | 340/18 P |

OTHER PUBLICATIONS

IBM Technical Bulletin, vol. 9, No. 6, Oct. 1966 Deskevich et al.

*Primary Examiner*—Samuel W. Engle
*Assistant Examiner*—S. A. Cangialosi
*Attorney, Agent, or Firm*—Albert C. Metrailer; Arthur McIlroy

[57] ABSTRACT

Apparatus for increasing the seismic data storage capacity of magnetic tape. A pair of storage registers store a sequential pair of digitized seismic data samples. A subtractor coupled to these two registers provides an output equal to the difference between the two stored samples. A decoder and a set of gates couples the difference word serially to a bit comparator starting with the most significant bit. The first logical "1" which is encountered and all the lower order bits of the same word are serially coupled to and written in a read/write memory. The decoder and gates cause a "0" to be written in a second read/write memory at the beginning of each data word, and "1's" to be written in addresses corresponding to the data written in the first read/write memory. The data in the read/write memories are addressed for reading by a read/address counter, which is incremented by an incremental shaft encoder on a drive motor of a tape recorder. An up-down counter continuously monitors the difference between the number of bits written into the read/write memories and the number read from the memories and serially recorded by the tape recorder. The output of the up-down counter is used to control tape recorder motor speed.

4 Claims, 2 Drawing Figures

SEISMIC DATA TAPE RECORDING SYSTEM

BACKGROUND OF THE INVENTION

This invention relates to seismic data tape recording systems, and, more particularly, to means for increasing the serial digital data storage capacity of magnetic tape.

It is customary in seismic geophysical surveying systems to store the acquired seismic data on magnetic recording tape. The amount of tape required to store the data has increased as more seismometers and groups of seismometers have been used to sense seismic signals. The use of mechanical vibrators to generate swept frequency acoustic waves in the ground has also increased the amount of data to be stored. The swept frequency signals are of longer time duration than the impulse-type signals generated by, for example, dynamite. In addition, the swept frequency signals are often repeated 10 or more times to provide signals which are summed to improve the signal-to-noise ratio.

Historically, as the amount of seismic data increased, recording systems were simply made larger by adding more recording tracks to tape recorders and by using more recorders and more cables to conduct signals from seismometers to the recorders. Such systems have become so complex that providing direct-wire cabling from all seismometers to the recorders has become impractical.

U.S. Pat. 3,806,864, entitled "Cableless Seismic Digital Recording System," issued to Broding, et al., Apr. 23, 1974, illustrates a solution to several of these problems. In the Broding patent, the cabling problem is solved by providing a plurality of portable tape recorders which are located in the field near the seismometer groups to which they are connected, and the recorders are controlled by radio signals from a centrally located truck. The small lightweight tape recorders used in this type of portable system typically use a narrow magnetic tape, and record only one channel of data. Samples of seismic data which are usually represented by 16 to 18 bit digital words must therefore be recorded serially on such tape recorders. At a recording density of about 800 bits per inch, approximately 6 feet of recording tape are required to record a typical 6-second record after an impulse-type initiation. This is based on a 2-millisecond sample period and 18 bit words describing each sample. For a typical 300-foot magnetic tape reel, which can be recorded in both directions to yield 600 feet of recording, a maximum of 100 records may be stored. In practice, the number of recordings which may be stored on a 300-foot tape reel varies between 50 and 75 due to the amounts of tape used in starting and stopping the recorder, and in recording identifying information about the records. This total recording capacity is sufficient to record a typical day's number of records when only impulse-type sources are used. If vibrator-type sources are used, this same 300-foot tape reel can store the information from only two or three complete records. This is because the record listening period is extended to about 10 seconds, and is repeated typically ten times so that approximately 100 feet of tape are consumed in storing the entire amount of data which constitutes a single record. Due to this fact, the portable, cableless digital recording systems have been limited to use with impulse-type seismic sources.

It is not practical to increase the data storage capacity of the portable recorders by increasing tape length or width for several reasons. Such changes would make the recorders larger and heavier and therefore less portable. Of greater importance is the fact that a larger tape requires more driving power to operate. The portable systems must be battery powered and are therefore inherently power limited. Thus, it is seen that the usefulness of portable recording systems in seismic work is limited by the data storage capacity of magnetic recording tape.

As disclosed in the above-referenced Broding patent, the typical seismic digital recording system includes a gain ranging amplifier having a gain control input driven by a digital gain level signal. This gain control input typically can change the amplifier gain by factors of two or four for each binary unit of input. The output of the gain ranging amplifier is digitized by an analog-to-digital converter which typically provides a twelve bit word, commonly called a "mantissa." The gain control input of the gain ranging amplifier is a four bit word which must be used together with the mantissa to completely define the amplitude of each sample. The purpose of this gain ranging amplifier arrangement is to increase the dynamic range of the digital recording system without greatly increasing the number of bits used to describe the amplitude of each sample.

SUMMARY OF THE INVENTION

Accordingly, an object of the present invention is to provide an improved seismic digital recording system.

Another object of the present invention is to provide a seismic digital recording system which increases the seismic data storage capacity of magnetic tape.

These and other objects of the present invention are achieved by providing in a seismic digital recording system means for coupling only those portions of the digitized data samples which contain amplitude information to a tape recorder and means for controlling the writing rate of the tape recorder. A digitized data sample is coupled serially to a bit comparator which detects the first logical "1" in the digital word. When the first logical "1" has been detected, the bit comparator sets a latch which allows the remaining bits of that digital word to be coupled to a temporary storage memory, from which the data is written onto magnetic tape. A controller keeps track of the number of words written into the temporary memory, and the number written from it onto the magnetic tape, and controls the recorder motor in response to the difference.

BRIEF DESCRIPTION OF THE DRAWINGS

Other objects, features, and advantages of this invention may be better understood by reading the following detailed description with reference to the accompanying drawings, wherein.

DESCRIPTION OF THE PREFERRED EMBODIMENT

Figure 1:
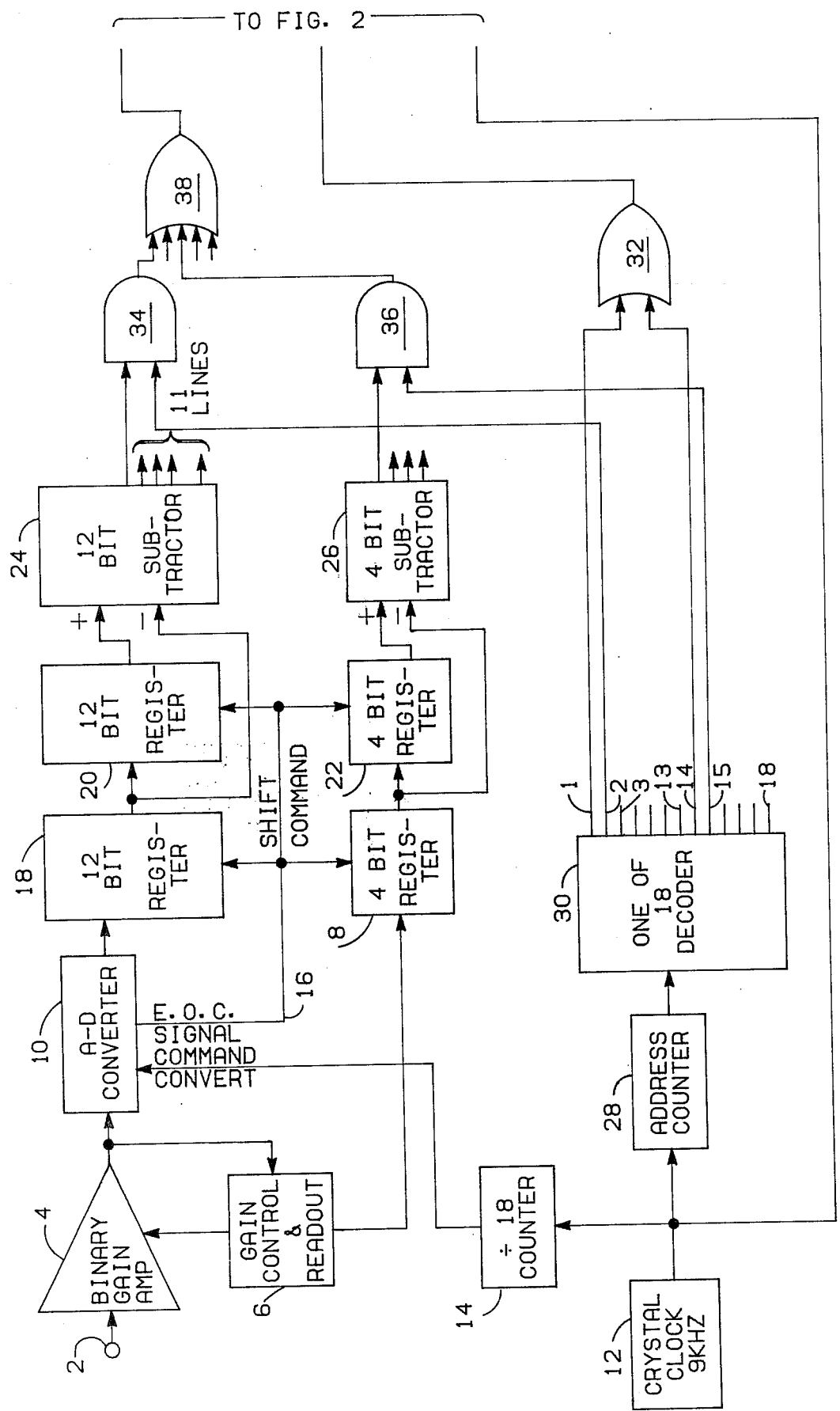
FIGS. 1 and 2, taken together, are a combination schematic and block diagram of the preferred embodiment of the present invention.
Figure 2:
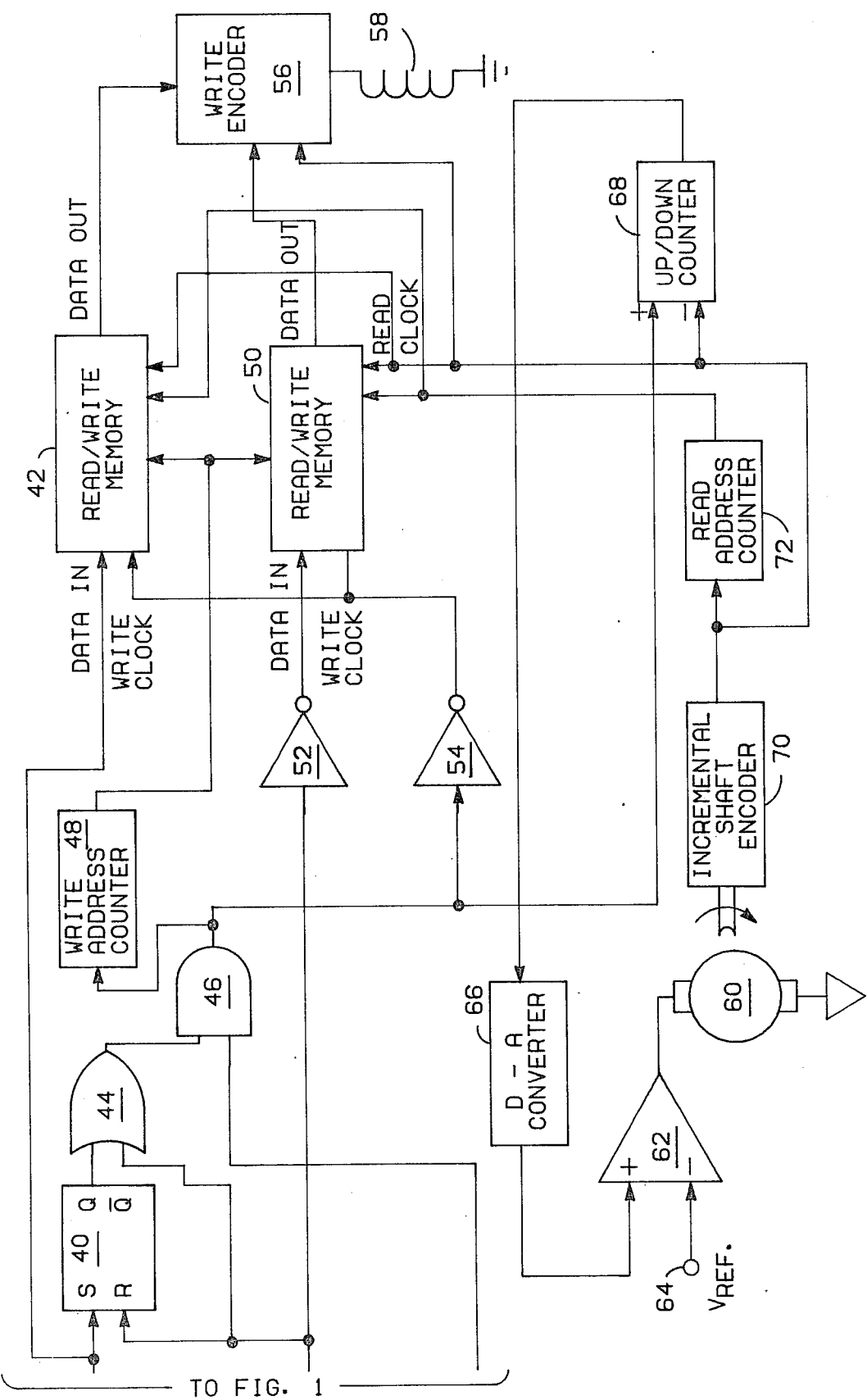

With reference to FIGS. 1 and 2, there is shown a combined logic and block diagram of the preferred embodiment of the present invention. An input 2 receives analog seismic data directly from a seismometer or group of seismometers, or, after preamplification and filtering, as illustrated in the above-referenced U.S. Pat. No. 3,806,864. The analog seismic data received at input 2 is amplified by a binary-gain amplifier 4. A gain control unit 6 receives the output of binary-gain amplifier 4, and generates a four bit digital gain control word, which is coupled to a gain-control input of amplifier 4, and also to a four bit storage register 8. An analog-to-digital converter 10 receives the output of amplifier 4 and generates a twelve bit binary word, representing the amplifier 4 output, when it receives a conversion command pulse. A crystal clock 12, having a frequency of 9000 hertz, provides a time reference for all the functions of the systems illustrated in FIGS. 1 and 2. A divide-by-18 counter 14 receives the output of clock 12, and generates pulses at the rate of 500 hertz, which are coupled to the conversion command input of A-to-D converter 10. Converter 10 generates the 12 bit binary word upon receipt of the conversion command signal from counter 14, and, when the conversion is complete, provides a pulse on an end-of-conversion signal output line 16. A twelve bit parallel storage register 18 has inputs coupled to the outputs of converter 10. Register 18 and four bit register 8 each have a shift-command input coupled to output 16 of converter 10. When the end of conversion signal pulse occurs on line 16, registers 18 and 8 store outputs of converter 10 and gain control 6, respectively, and provide the stored values at their outputs. A second 12 bit register 20 and four bit register 22 have inputs coupled to the outputs of registers 18 and 8, respectively. Registers 20 and 22 also have shift-command inputs coupled to the output 16 of converter 10. When the pulse occurs on line 16, registers 20 and 22 store the outputs of registers 18 and 8. A 12 bit subtractor 24 and a four bit subtractor 26 have positive inputs coupled to the outputs of registers 20 and 22, respectively, and negative inputs coupled to the outputs of registers 18 and 8, respectively. The output of subtractor 24 is a 12 bit word, which is equal to the difference between the mantissas of two successive samples of the seismic data received at input 2. The output of subtractor 26 is likewise equal to the difference between two successive gain levels corresponding to successive samples of the seismic signal received at input 2.

The sequential differencing which is performed by registers 8, 18, 20, and 22 and subtractors 24 and 26, enhance the data compression which is performed by the rest of the circuitry on FIGS. 1 and 2. This is due to the fact that seismic signals of interest are in the frequency range of approximately 10 to 80 hertz. In this frequency range, the differences between successive 2-milisecond data samples are typically less than the maximum value which can be stored in a 12 bit mantissa. As a result, one or more of the higher order bits of each difference are zeros and carry no actual information. Increased tape storage capacity is achieved in the present invention by writing only those portions of the data words which contain actual information on the magnetic tape.

The present invention also improves the data storage capacity of magnetic tape in digital recording systems such as that disclosed in the Broding patent, even without the enhancement achieved by recording only the difference in amplitude between successive samples. This is due to the fact that binary-gain amplifiers, such as amplifier 4 of FIG. 1, typically have fixed gain changes of multiples of two or four. That is, when the output of amplifier 4 reaches a selected maximum value, the gain-control unit 6 causes amplifier 4 to reduce its gain by a factor of two or four, as desired in the particular application. Since it is unlikely that the amplitude of the seismic analog information will always increase by a factor of four from one 2-millisecond sample to the next, the output of amplifier 4 at a sampling period following a gain decrease is often only one-fourth of the peak value in systems where the gain control unit 6 increments gain by a factor of four. In such a case, at least the two most significant digital bits are zeros. In addition, the gain-change breakpoint must be selected to properly handle the case of a large amplitude increase in the sample following a gain increase without overflowing the digital register. This results in an additional one or two high-order bits being zeros in a significant percentage of samples. As a result, a substantial savings in tape required to store a single record is achieved by not writing the high-order bit zeros of the words generated by A-to-D converter 10 and gain control unit 6 for each sample. This storing of absolute values can be achieved without the use of the differencing apparatus comprising registers 20 and 22, and subtractors 24 and 26. The outputs of registers 18 and 8 would be connected directly to gates 34 and 36 in place of the interconnections shown in FIG. 1.

In the preferred embodiment, an address counter 28 receives the 9000-hertz signal from clock 12, and provides as its output a repetitive sequence of 18 digital addresses, which are coupled to a decoder 30. Decoder 30 has 18 output lines and provides a logical "1" level on one of these 18 lines at a time, as controlled by the address it receives from counter 28. The first and fourteenth outputs of decoder 30 are coupled to the two inputs of an OR gate 32, the output of which provides signals to the circuitry of FIG. 2 to mark the beginnings of the mantissa and gain words. The complete operation of this marking is to explained in more detail below. The second output of decoder 30 is coupled to one input of an AND gate 34, which has a second input coupled to the highest order bit output of subtractor 24. The third through thirteenth output lines from decoder 30 are coupled to one input each of 11 other AND gates, like gate 34, but which are not illustrated for simplicity. Each of these other 11 gates has a second input coupled to one of the 11 other outputs of subtractor 24 in descending bit order. The fifteenth output of decoder 30 is coupled to one input of an AND gate 36, which has a second input receiving the highest order bit from subtractor 26. Outputs sixteen, seventeen and eighteen of decoder 30 are each coupled to one input of three other AND gates like AND gate 36, which are not shown for simplicity. These three other AND gates each have a second input coupled to the three other outputs from subtractor 26 in descending bit order. The output of AND gate 34 and its 11 corresponding AND gates and AND gates 36 and its three corresponding AND gates are all coupled to the inputs of an OR gate 38. The output of OR gate 38 is coupled to the set input of a flip-flop 40 (FIG. 2). The output of OR gate 38 is also coupled to the data input of a read/write memory 42. The output of OR gate 32 is coupled to the reset input of flip-flop 40, and also to one input of an OR gate 44. A second input of gate 44 is coupled to the Q output of flip-flop 40. The output or OR gate 44 is coupled to one input of an AND gate 46 which has a second input coupled to the crystal clock 12. The output of AND gate 46 is coupled to the input of a write address counter 48, which is a simple binary counter which increases in value by one binary unit each time a positive-going transition is coupled to its input. The output of counter 48 is coupled to the write address inputs of read/write memory 42 and a second read/write memory 50. The output of OR gate 32 is coupled through an inverter 52 to a data input line of read/write memory 50. The output of AND gate 46 is coupled through an inverter 54 to the write clock inputs of both memories 42 and 50.

Data output lines of memories 42 and 50 are coupled to two inputs of a write encoder 56, which controls a recording head coil 58 for writing digital information onto magnetic recording tape. Encoder 56 also has an input coupled to the output of an incremental shaft encoder 70 which is described below. A DC tape drive motor 60 moves magnetic recording tape across recording head 58 when it is driven by signals from an amplifier 62. Amplifier 62 has a negative input 64 for receiving a reference voltage. A positive input to amplifier 62 is coupled to the output of a digital-to-analog converter 66. The digital inputs of converter 66 are coupled to the output of an up-down counter 68. A positive, or up-count, input of counter 68 is coupled to the output of AND gate 46, which causes the numbers stored in counter 68 to increase each time the address in counter 48 changes. The negative, or downcount, input of counter 68 is coupled to an incremental shaft encoder 70 which generates an output pulse each time drive motor 60 moves a preselected amount. In the preferred embodiment, this movement is 1/800 of an inch to provide a write data density of 800 bits per inch. The output of encoder 70 is also coupled to the input of a read address counter 72, which has an output coupled to read address inputs of memories 42 and 50. The output of encoder 70 is additionally coupled to the read clock inputs of memories 42 and 50.

In operation, seismic signals are coupled to input 2 of binary-gain amplifier 4 which amplifies the signal by an amount determined by gain control unit 6 and couples the amplifier signals to the input of A-to-D converter 10. When a pulse is generated by counter 14 in response to the output of crystal clock 12, A-to-D converter 10 generates a 12 bit mantissa at its output, corresponding to the signal it received from amplifier 4. As in the prior art, this twelve bit mantissa, plus the four bit binary-gain control words generated by control unit 8, form a digital representation of a discrete sample of the seismic data. When converter 10 generates a pulse on line 16 indicating the conversion is complete, this 12 bit mantissa and four bit exponent are stored in registers 18 and 8, respectively. When a second conversion has been made by converter 10, the data stored in registers 18 and 8 are coupled to registers 20 and 22, respectively. Subtractors 24 and 26 then provide at their outputs the difference between the mantissas and exponents stored in registers 18 and 20, and 8 and 22, respectively. Each bit of this newly generated difference mantissa and exponent is coupled to one input of the 16 two input AND gates, of which only the AND gates 34 and 36 are illustrated. The address counter 28 sequentially addresses decoder 30 to cause a logic "1" to appear on one of the 18 output lines in sequence. Output numbers one and fourteen are coupled to OR gate 32, which has the purpose of generating a mark in the recorded data at the beginning of each mantissa and exponent which is to be stored on tape. This is accomplished by having the output of OR gate 32 coupled to the reset output of flip-flop 40, which prevents the writing of any actual data when the output of OR gate 32 is high. The output is also coupled through OR gate 44 to AND gate 46, which allows a clock pulse from clock 12 to increment write address counter 48 by one bit. The output of AND gate 46 is also coupled through inverter 54 to the write clock inputs of memories 42 and 50, so that the negative-going edge of clock signals from clock 12, memories 42 and 50 write a bit at the new address stored in counter 48. At this time, none of the mantissa or exponent gates, such as gates 34 and 36, are receiving a "1" from decoder 30, and therefore the input to memory 42 is a "0". The output of OR gate 32 is a "1" which is inverted by inverter 52 so that memory 50 also has a "0" in its input. This coincidence of written "0's" and, more particularly, the "0" being written in memory 50 in an indication of a mark, or beginning of a mantissa or exponent word.

When decoder 30 is addressed for its second output, AND gate 34 receives a "1" from output 2 of decoder 30. If the data line from subtractor 24, which is coupled to gate 34, is also a "1", a logic "1" is then coupled through OR gate 38 to the set input of flip-flop 40, and to the data input of memory 42. The Q output of flip-flop 40 then goes to logic "1" level, which is coupled through OR gate 44 to AND gate 46, which allows the signal from clock 12 to increment counter 48. As occurred when writing a mark, the output of gate 46 also passes through inverter 54 to cause memories 42 and 50 to write the data appearing at their data input lines. Memory 42 then writes a "1", while memory 50 writes a "1" indicating the occurrence of data in memory 42. If the data line from subtractor 24 to gate 34 is a "0", flip-flop 40 remains in it reset state, address counter 48 remains unchanged, and no writing occurs in memories 42 and 50. Instead, decoder 30 simply continues to sequence its logical "1" to the additional gates for sampling the outputs of subtractor 24. When the first "1" is detected, the setting of flip-flop 40 occurs, counter 48 begins to increment, and all the lower order bits of the word in the output of subtractor 24 are written into memory 42. When decoder 30 increments to output 14, another mark indication is written into memories 42 and 50, as occurred when output 1 was a logic "1". When decoder output 15 is a logic "1", the highest order bit of the exponent from subtractor 26 is sampled in the same manner that the outputs of subtractor 24 was sampled. As in the case of subtractor 24, no data is written into memory 42 until the highest order "1" detected, and then it and all lower order bits are written into memory 42.

Memories 42 and 50 may be considered rubber-band memories which store a variable amount of information so that the information written into the memories may be read out at a different rate. In the preferred embodiment, a standard single-speed tape recorder is modified to allow tape-speed control, so that the average tape speed may be adjusted to correspond to the average data available rate. This is achieved by using shaft encoder 70 to keep track of actual tape motion by generating pulses at the rate of 800 bits per inch of tape motion. The outputs of encoder 70 are used to increment a read address counter 72 and to drive the read/clock inputs of memories 42 and 50. Up-down counter 68 receives the output of encoder 70 and the output of AND gate 46, and provides a digital output equal to the difference between the number of bits written into read/write memory 42 and the number read from memory 42. This digital output of counter 68 is converted to an analog voltage by D-to-A converter 66, which is coupled to the positive input of amplifier 62. By proper adjustment of amplifier 62 and control reference voltage 64, the average amount of data bits stored in memory 42 remains constant.

As data is written into memory 42, the count stored in counter 68 increases and causes motor 60 to start moving tape across the recording head 58. As motor 60 moves, it also causes incremental shaft encoder 70 to start outputting pulses which increment counter 72, strobe the read clock inputs of memories 42 and 50, and cause encoder 56 to write data bits onto the magnetic tape. Write encoder 56 may be one of a variety of commercially available encoders such as the bi-phase encoder employed in the above-referenced U.S. Pat. No. 3,806,864. If encoder 56 is receiving a logic "0" on its input from memory 50 at the time it receives a pulse from encoder 70, then it writes a mark indicating the beginning of a new data word. If encoder 56 is receiving a logical "1" from memory 50 at the time it receives the pulse from encoder 70, then it writes a data bit corresponding to the data bit it is receiving at the time from memory 42. This process of writing serial data words, each preceded by a mark, continues as long as unrecorded data is present in memory 42, which condition is indicated by the presence of any count other than zero in counter 68.

It is apparent that various modifications may be made within the scope of the present invention. For example, as discussed above, if recording of the absolute values of the mantissa and exponent are preferred, registers 20 and 22, and subtractors 24 and 26 may be eliminated. In such a case, the outputs of registers 18 and 8 are coupled directly to the AND gates 34 and 36, and their 14 corresponding AND gates. In some cases, it may also be desirable to make a dynamic decision as to whether the absolute value of each word or its difference from the previous word should be stored. This may be done by adding additional twelve and four bit subtractors to the apparatus of FIG. 1. The additional subtractors would compare the words stored in registers 18 and 8 to those at the outputs of subtractors 24 and 26, respectively. Additional gating would also be required to allow coupling of either of the two compared words to the gates 34 and 36, according to which is the smaller. A third addition required to make the dynamic decision-making operative is additional encoding to identify each word as either an absolute value or a difference value. While this modification requires considerably more circuitry than either pure absolute value or pure difference recording, it would achieve the maximum reduction in stored data while avoiding one of the major objections to difference recording, which is that if an error occurs in difference recording, it is carried through the rest of the record. It may also be desirable to provide a storage of a different type of mark at the beginning of the mantissa than is used at the beginning of the exponent. This may be done with additional gating to provide storage of a "1" in a mark address in memory 42 before a mantissa is written, while a "0" is stored before the exponent. Then, the occurrence of a "0" at a given address in memory 50 would indicate the presence of a mark, and the corresponding "1" or "0" at the same address in memory 42 would distinguish between the mantissa mark and the exponent mark. It may also be desirable in some systems for accuracy or power requirements to operate drive motor 60 at only a single speed. One way to accomplish this is to provide enough storage in memories 42 and 50 to record an entire record, which is then written on the tape only after the record is complete. An alternate method, requiring much less memory capacity, is to replace amplifier 62 with a comparator which turns motor 60 on full speed when its input rises above a preselected level and turns the motor 60 off when its input drops below a second lower preselected level.

Although the present invention has been shown in the form of specific apparatus, it is apparent that the above and other changes may be made within the spirit and scope of the present invention as defined in the appended claims.

I claim:

1. In a seismic data recording system of the class wherein analog electrical signals are generated by a seismometer in response to acoustic waves in the earth, said electrical signals are sequentially converted to digital words at a fixed rate of conversions per second, and said digital words are coupled to a magnetic tape recorder to be written onto magnetic tape, the improvement comprising the combination of:

gating means having an input for receiving a digital word and a data output for providing the digital word one bit at a time, beginning with the most significant bit and ending with the least significant bit;

bit comparator means coupled to said gating means output for detecting the first bit which has a value of "1" and for coupling that bit and all lower value bits to an output;

a data buffer memory coupled to the bit comparator output for storing the bits coupled to the comparator output;

a variable speed magnetic tape recorder coupled to said buffer memory for writing the bits stored in the buffer memory onto magnetic tape at an essentially constant bits per inch rate; and control means coupled to the buffer memory and said variable speed tape recorder for controlling the speed of said variable speed tape recorder in response to the difference between the number of bits written into said buffer memory and the number written on said magnetic tape.

2. A seismic data recording system according to claim 1 further including:

first and second memories having inputs for receiving a sequential pair of said digital words and having outputs for providing the words stored in said memories; and a digital subtractor coupled to said first and second memories having an output for providing a digital word equal to the difference between the words stored in said first and second memories, said subtractor output coupled to said gating means.

3. A seismic data recording system according to claim 1 wherein said gating means has a mark output for providing a mark signal indicative of the beginning of a digital word, and further including a mark read/write memory coupled to said gating means for storing mark signals at addresses corresponding to the beginning of data words stored in the data memory, said mark memory having an output coupled to said tape recorder for causing it to write marks on the tape indicating the beginning of data word written on the tape.

4. A seismic data recording system according to claim 1 wherein said control means includes:

an incremental shaft encoder coupled to the tape recorder;

a counter coupled to the data buffer memory and the shaft encoder for providing an output proportional to the difference between the number of bits written into said memory and the number of bits written onto magnetic tape; and a recorder motor control amplifier coupled to said counter and having an output coupled to the tape recorder for controlling tape speed to maintain the counter output at a preselected level.

* * * * *